(12) United States Patent
Kadayam et al.

(10) Patent No.: US 8,386,425 B1
(45) Date of Patent: Feb. 26, 2013

(54) OUT OF ORDER DELIVERY FOR DATA AND METADATA MIRRORING IN A CLUSTER STORAGE SYSTEM

(75) Inventors: Harihara S. Kadayam, Sunnyvale, CA (US); Hari Shankar, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 414 days.

(21) Appl. No.: 12/709,185

(22) Filed: Feb. 19, 2010

(51) Int. Cl.
*G06F 7/00* (2006.01)
(52) U.S. Cl. ......... 707/613; 707/658; 707/659; 707/690
(58) Field of Classification Search .................. 707/613, 707/655, 658, 659
See application file for complete search history.

(56) References Cited

U.S. PATENT DOCUMENTS

| 7,143,122 B2 * | 11/2006 | Burton et al. ................. 707/613 |
| 7,406,487 B1 | 7/2008 | Gupta |
| 7,676,514 B2 * | 3/2010 | Faibish et al. ................. 707/646 |
| 7,707,186 B2 | 4/2010 | LeCrone |
| 7,752,166 B2 | 7/2010 | Quinlan |
| 7,827,139 B2 | 11/2010 | Schauser |
| 8,018,720 B2 | 9/2011 | Campbell |
| 8,019,720 B2 * | 9/2011 | Jasik et al. .................... 707/613 |
| 8,150,811 B1 * | 4/2012 | Tarenskeen et al. .......... 707/659 |
| 2007/0033354 A1 * | 2/2007 | Burrows et al. ............... 711/156 |
| 2010/0049930 A1 * | 2/2010 | Pershin et al. ................ 711/162 |
| 2010/0145949 A1 | 6/2010 | Arrouye |
| 2010/0235326 A1 | 9/2010 | Fashchik |
| 2011/0153568 A1 | 6/2011 | Shang |

OTHER PUBLICATIONS

U.S. Appl. No. 12/709,790, filed Feb. 19, 2010, Harihara S. Kadayam.
Office Action dated May 31, 2012 issued by the USPTO for U.S. Appl. No. 12/709,190.

* cited by examiner

*Primary Examiner* — Pierre Vital
*Assistant Examiner* — Christopher J Raab
(74) *Attorney, Agent, or Firm* — Stattler—Suh PC

(57) ABSTRACT

Described herein are a system and method for remote mirroring of data and metadata from a local node to a remote node using out-of-order delivery (OOD), while also providing data integrity at the remote node. OOD may utilize increased throughput of multiple connection paths between nodes. A mirroring layer/engine executing on the local node may receive related groups of data and metadata for storing to the remote node, each related group comprising one or more data sets and one metadata set that describes and is associated with each of the one or more data sets in the related group. The mirroring layer provides data integrity at the remote node by ensuring that the metadata set of a related group is stored to the remote node only after all the data sets in the related group are stored to the remote node, thus ensuring data consistency at the remote node.

16 Claims, 9 Drawing Sheets

OUT OF ORDER DELIVERY FOR DATA AND METADATA MIRRORING IN A CLUSTER STORAGE SYSTEM

FIELD OF THE INVENTION

The present invention relates to storage systems, and particularly, to out of order delivery for data and metadata mirroring in a cluster storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units (LUs). For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from NetApp, Inc. Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing access requests (read/write requests) as file-based and block-based protocol messages (in the form of packets) to the system over the network.

A plurality of storage systems may be interconnected to provide a storage system architecture configured to service many clients. In some embodiments, the storage system architecture provides one or more aggregates and one or more volumes distributed across a plurality of nodes interconnected as a cluster. The aggregates may be configured to contain one or more volumes. The volumes may be configured to store content of data containers, such as files and logical units, served by the cluster in response to multi-protocol data access requests issued by clients.

Each node of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each node is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The nodes of the cluster may be configured to communicate with one another to act collectively to increase performance or to offset any single node failure within the cluster. Each node in the cluster may have a predetermined failover "partner" node that may take over/resume storage functions of the node upon failure of the node. When a node failure occurs (where the failed node is no longer capable of processing access requests for clients), the access requests sent to the failed node may be re-directed to the partner node for processing. As such, the cluster may be configured such that a partner node may take over the work load of a failed node. As used herein, a local/source node may have data and metadata that is mirrored/copied to a remote/destination node in the cluster storage system (as discussed below). The remote node may comprise a predetermined failover partner node of the local node. As used herein, various components residing on the local node may likewise be referred to as a local component (e.g., local memory, local de-staging layer, etc.) and various components residing on a remote node may likewise be referred to as a remote component (e.g., remote memory, remote de-staging layer, etc.).

A cluster provides data-access service to clients by providing access to shared storage (comprising a set of storage devices). Typically, clients will connect with a node of the cluster for data-access sessions with the node. During a data-access session with a node, a client may submit access requests (read/write requests) that are received and performed by the node. For the received write requests, the node may produce write logs that represent the write requests and locally store the write logs to a volatile storage device (from which, the node may at a later time perform the write logs on the storage devices).

To ensure data consistency and provide high data availability, the write logs may also be stored to two non-volatile storage devices. Typically, the write logs of the node may be locally stored to a non-volatile storage device and also be stored remotely to a non-volatile storage device at a partner node (sometimes referred to herein as mirroring data to a remote node). As such, if the local node fails, the remote partner node will have a copy of the write logs and will still be able to perform the write logs on the storage devices. Also, if the write logs stored at the partner node is corrupted or lost, the write logs stored locally in the non-volatile storage device at the local node can be extracted/retrieved and used to perform the write logs on the storage devices.

As such, data in a local non-volatile storage device at a local node may be mirrored to a remote non-volatile storage device of a remote node to provide failover protection (e.g., in case the local node crashes) and high availability of data in the cluster storage system. The mirrored data may comprise write logs, or any other data that is to be stored to the non-volatile storage devices.

Currently, remote mirroring of data implements an "in-order delivery" (IOD) requirement, whereby mirroring applications and connections between the nodes typically support in-order delivery of data between the nodes. For in-order delivery of data, the data is expected to be received at the remote node in the same time order as it was sent at the local node. For example, if data sets are sent at the local node in a time order comprising data sets W, X, and then Y, the IOD requirement requires that the remote node receives the data sets in the same time order (i.e., receive in order W, X, and then Y). IOD of data results when there is a single connection path between the local and remote nodes.

In contrast, "out-of-order delivery" (OOD) of data results when there are multiple connection paths between the local and remote nodes. Multiple connection paths may be implemented to increase data throughput and bandwidth between nodes. For OOD of data, the data is not expected to be received at the remote node in the same time order as it was sent at the local node and may arrive in any order. As such, in the above example, data set Y may arrive at the remote node prior to data sets W and X in OOD.

OOD of data from the local node to the remote node may compromise data integrity at the remote node. Typically, for a group of related data sets (e.g., data sets W, X, Y), there may also be a metadata set (e.g., metadata set Z) that describes each of the related data sets (e.g., metadata set Z describes data sets W, X, Y), the metadata set to also be stored to the local and remote non-volatile storage devices. As used herein, a "related group" of data and metadata sets may comprise one or more data sets and one metadata set that describes and is associated with each of the one or more data sets. As used herein, "data integrity" exists when the metadata set of a related group is written to the remote non-volatile storage device only after each of the data sets within the related group is written to the remote non-volatile storage device. If the metadata set of a related group is written before each of the data sets within the same related group is written, data corruption and inconsistency in the remote non-volatile storage device may result.

For example, the data sets of a related group may comprise data sets W, X, Y and metadata set Z, where metadata set Z specifies that there are 3 valid data sets and the time order of transmitting to the remote node is W, X, Y, and then Z. A "valid" data set may comprise client data that is pending to be stored to the local and remote non-volatile storage devices. In IOD of data, data integrity is intact since the time order of receiving and writing to the remote node is also W, X, Y, and then Z (where metadata set Z is written to the remote non-volatile storage device only after data sets W, X, and Y are written). When the metadata set Z is written to the remote non-volatile storage device, this indicates that 3 valid data sets have already been successfully written to the remote non-volatile storage device. As such, in IOD of data, the data and metadata stored at the remote node would be consistent as metadata set Z written to the remote non-volatile storage device would accurately reflect that 3 valid data sets W, X, and Y have been written to the remote non-volatile storage device.

However, in OOD of data, data integrity may not exist if, for example, metadata set Z is received and written to the remote node prior to data sets X and Y. In this example, the data and metadata stored at the remote node would not be consistent as metadata set Z being written to the remote non-volatile storage device would indicate that the 3 valid data sets W, X, and Y have already been written to the remote non-volatile storage device, when this in fact is not true. If a crash were to occur at the remote node before data sets X and Y were written to the remote non-volatile storage device, data corruption at the remote non-volatile storage device would result. As such, use of OOD of data typically does not provide data integrity at the remote non-volatile storage device at each point in time.

Thus, IOD is typically used for remote mirroring as it provides data integrity at the remote node at any point in time. However, use of IOD for remote mirroring has significant drawbacks. For example, multiple connection paths between the nodes may be used to increase data throughput and connection bandwidth between nodes. However, multiple connection paths between nodes may cause OOD of data. As such, IOD of data for remote mirroring may not take advantage of the increased data throughput and connection bandwidth provided by multiple connection paths between the nodes and OOD of data. As such, there is a need for an improved method for remote mirroring of data and metadata between nodes of a cluster storage system.

SUMMARY OF THE INVENTION

Described herein are a system and method for remote mirroring/copying data and metadata from a local node to a remote node using OOD. In some embodiments, OOD is used for remote mirroring of data to the remote node while also providing data integrity at the remote node at any given point of time. In these embodiments, the OOD of data may utilize the increased data throughput of multiple connection paths between the local and remote nodes.

In some embodiments, the local/source node executes software layers or applications (referred to as "mirroring clients") that may require data and metadata to be stored to a local non-volatile storage device and mirrored/stored to a remote non-volatile storage device on the remote/destination node. In some embodiments, a mirroring client comprises a software layer (e.g., file system layer) of a storage operating system executing on the local node. For storing data and metadata to the local non-volatile storage device, a mirroring client may send the data and metadata to software layers of the storage operating system that store the data and metadata using methods known in the art. For storing data and metadata to the remote non-volatile storage device, each mirroring client may also send a stream of data and metadata to a mirroring layer/engine (sometimes referred to as an interconnect (IC) layer/engine) of the storage operating system that stores the data and metadata using methods described herein.

In some embodiments, the mirroring layer/engine may perform embodiments described herein. The mirroring layer may receive the stream of data and metadata from each mirroring client and store the received data and metadata to a remote node using OOD of data, while also providing data integrity at the remote node. Each mirroring client may send related groups of data and metadata sets, a related group comprising one or more data sets and one metadata set that describes and is associated with each of the one or more data sets in the related group. In these embodiments, the mirroring layer provides data integrity at the remote node by ensuring that the metadata set of a related group is stored to the remote node only after all the data sets in the related group are stored to the remote node, thus ensuring data consistency at the remote node.

In some embodiments, the mirroring layer does so by producing a data and metadata request (DMR) data structure for each mirroring client sending data and metadata sets to the mirroring layer. The mirroring layer may treat each received data and metadata set as a request (having a unique request identifier) from the mirroring client to mirror/store the data or metadata set to the remote node. In some embodiments herein, the terms data or metadata "set" may be used interchangeably with the terms data or metadata "request." The mirroring layer may queue/store each received data and metadata set/request to the DMR data structure for the mirroring client. In some embodiments, the mirroring layer then transmits data sets/requests from the DMR data structure to the remote node for storage to the remote non-volatile storage device. In these embodiments, the mirroring layer may delay transmitting the metadata sets/requests from the DMR data structure to the remote node until each related data set/request in the related group of the metadata set/request has been completed (i.e., successfully stored to the remote non-volatile storage device). By doing so, data integrity may be provided at the remote node in OOD of data and metadata.

Typically, each mirroring client will continually query the mirroring layer to determine if its data and metadata sets/requests sent to the mirroring layer have been completed. The mirroring layer may also produce a request field/variable for indicating the request identifiers of sets/requests that have been currently completed thus far. In some embodiments, the mirroring layer may update the value of the request field/variable in a manner that makes the OOD of data and metadata transparent to the mirroring client.

In some embodiments, the mirroring layer may perform remote mirroring using OOD while maintaining data integrity at the remote node, without use of a processor executing on the remote node. In these embodiments, the mirroring layer may perform the remote mirroring using remote direct memory access (RDMA) methods without requiring use or involvement of a processor of the remote node. While other methods using OOD for remote mirroring may require the processor of the remote node to re-assemble data and metadata received out-of-order at the remote node to provide data integrity, embodiments described herein may not require such re-assembly of data and metadata and/or the use of the processor of the remote node.

OOD may also be used for compliance with an existing network infrastructure. A particular network infrastructure may support OOD, whereas current remote mirroring does not. To use OOD in compliance with the existing network infrastructure may avoid the cost of a dedicated network infrastructure for remote mirroring and utilize the existing network infrastructure.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into three sections. Section I describes a cluster environment in which some embodiments operate. Section II describes a storage operating system having a mirroring layer for remote mirroring of data and metadata to a remote node. Section III describes a method and apparatus for providing data integrity in remote mirroring of data and metadata to a remote node using OOD.

I. Cluster Environment

Figure 1A:
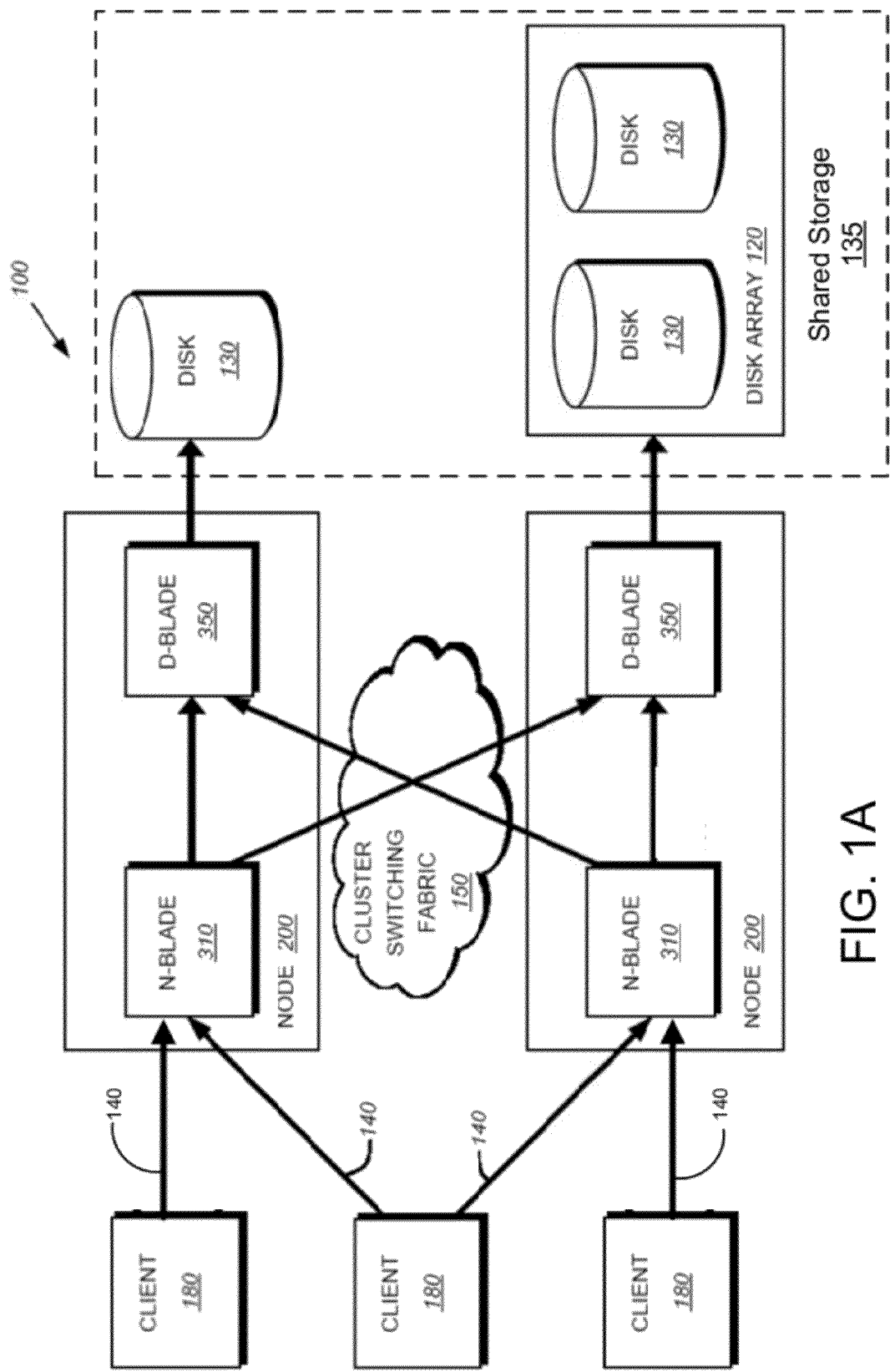
FIGS. 1A-B are schematic block diagrams of an exemplary cluster environment in which some embodiments operate.
Figure 1B:
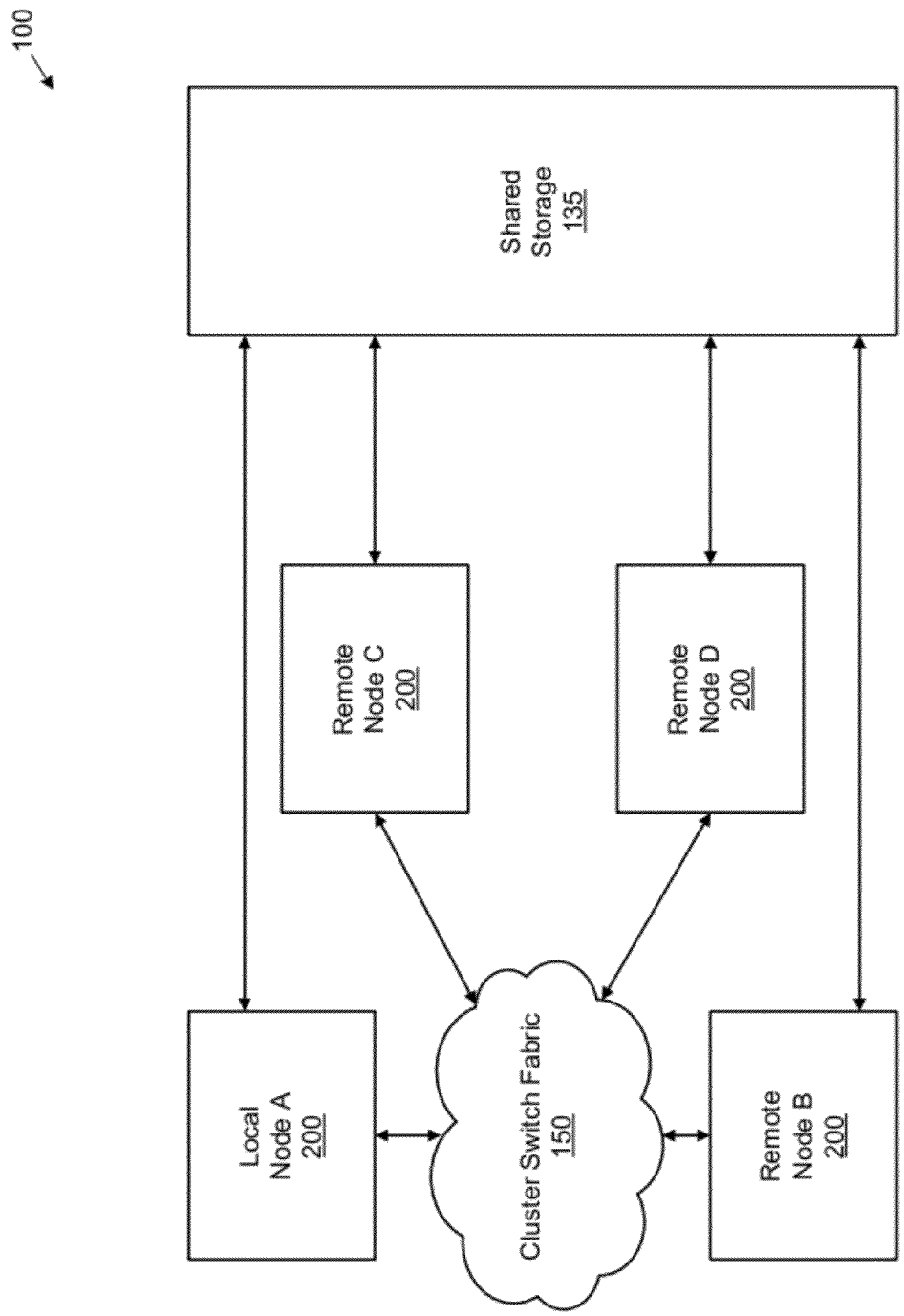

FIGS. 1A-B are schematic block diagrams of an exemplary cluster 100 environment in which some embodiments operate. A cluster 100 may comprise a plurality of interconnected nodes 200 configured to provide storage services for a set of storage devices. The nodes 200 comprise various functional components that cooperate to provide a distributed storage system architecture of the cluster 100.

As shown in FIG. 1A, each node 200 may be organized as a network element (N-blade 310) and a disk element (D-blade 350). The N-blade 310 includes functionality that enables the node 200 to connect to clients 180 over a computer network 140, while each D-blade 350 connects to one or more storage devices, such as disks 130 of a disk array 120. The nodes 200 are interconnected by a cluster switching fabric 150 (discussed below).

It should be noted that although disks 130 are used in some embodiments described below, any other type of storage device may be used as well. For example, a solid state storage device may be used instead, the solid state device having no mechanical moving parts for reading and writing data. Some examples of solid state devices include flash memory, non-volatile storage device (NVRAM), Magnetic Random Access Memory (MRAM), Phase Change RAM (PRAM), etc. In other embodiments, other storage devices other than those mentioned here may also be used.

Also, it should be noted that while there is shown an equal number of N and D-blades in the illustrative cluster 100, there may be differing numbers of N and/or D-blades, and/or different types of blades implemented in the cluster 100 in accordance with various embodiments. For example, there may be a plurality of N-blades and/or D-blades interconnected in a cluster configuration 100 that does not reflect a one-to-one correspondence between the N and D-blades. As such, the description of a node 200 comprising one N-blade and one D-blade should be taken as illustrative only. For example, a node 200 may also have one N-blade and a plurality of D-blades, a plurality of N-blades and one D-blade, or a plurality of N-blades and a plurality of D-blades.

The clients 180 may be general-purpose computers configured to interact with the node 200 in accordance with a client/server model of information delivery. That is, each client 180 may request the services of the node 200 (e.g., by submitting read/write requests), and the node 200 may return the results of the services requested by the client 180, by exchanging packets over the network 140. The client 180 may submit access requests by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may submit access requests by issuing packets using block-based access protocols, such as the Small Computer Systems Interface (SCSI) protocol encapsulated over TCP (iSCSI) and SCSI encapsulated over Fibre Channel (FCP), when accessing information in the form of blocks.

In some embodiments, a client 180 connects to a node 200 for a data-access session with the node 200. During a data-access session, the client 180 may submit access requests that are received and performed by the node 200. Such access requests may include storage state requests, a storage state request comprising a request that alters the data state of a storage device 130. Examples of storage state requests include requests for storing new data to a file, deleting a file, changing attributes of a file, etc. For illustrative purposes, storage state requests may be generically referred to herein as write requests.

In some embodiments, the totality of storage space provided by the disks 130 and disk arrays 120 of the cluster 100 comprise a total shared storage space (referred to as "shared storage 135") of the cluster 100. In other embodiments, the shared storage 135 comprises the totality of storage space provided by other types of storage devices (such as solid state storage devices). The shared storage 135 is accessible by each D-blade 350 of each node 200 in the cluster 100. In some embodiments, the cluster 100 may provide high availability of service to clients 180 in accessing the shared storage 135. For example, the nodes 200 may be configured to communicate with one another (e.g., via cluster switching fabric 150) to act collectively to offset any single node 200 failure within the cluster 100.

FIG. 1B shows an embodiment where each node 200 may have one or more predetermined failover "partner" nodes 200. Each node is configured for providing data-access service to clients connected with the node. When a node 200 failure occurs (where the failed node is no longer capable of processing access requests for clients 180), the one or more partner nodes 200 are configured to automatically resume/take over the data-access service functions provided by the failed node 200. As such, when a node failure occurs, access requests sent to the failed node 200 may be re-directed to the one or more partner nodes 200 for processing and execution. Note that a node 200 failure may occur unintentionally or intentionally (e.g., where a node is taken offline for servicing).

To ensure data consistency and provide high data availability, a local/source node (e.g., local node A) may have data and metadata stored to a local non-volatile storage device that is mirrored/copied to a remote non-volatile storage device at a remote/destination node (e.g., remote node B) in the cluster 100. Likewise, remote node B may have data and metadata stored to the remote non-volatile storage device that is mirrored/copied to a local non-volatile storage device at the local node A. The remote node B may comprise a predetermined failover partner node of the local node A. Likewise, the local node A may comprise a predetermined failover partner node of the remote node B. As used herein, various software and hardware components residing on the local node may be referred to as a "local" component (e.g., local non-volatile storage device, local de-staging layer, etc.) and various components residing on a remote node may be referred to as a "remote" component (e.g., remote non-volatile storage device, remote de-staging layer, etc.).

The data and metadata mirrored from the local node A to remote node B may comprise, for example, write logs. As such, if the local node A fails, the remote partner node B will have a copy of the write logs and will still be able to perform the write logs on the storage devices. In other embodiments, the data and metadata mirrored from the local node A to remote node B may comprise any other type of data and metadata. As such, data in a local non-volatile storage device at a local node may be mirrored to a remote non-volatile storage device of a remote node to provide failover protection (e.g., in case the local node crashes) and high availability of data in the cluster storage system.

Figure 2:
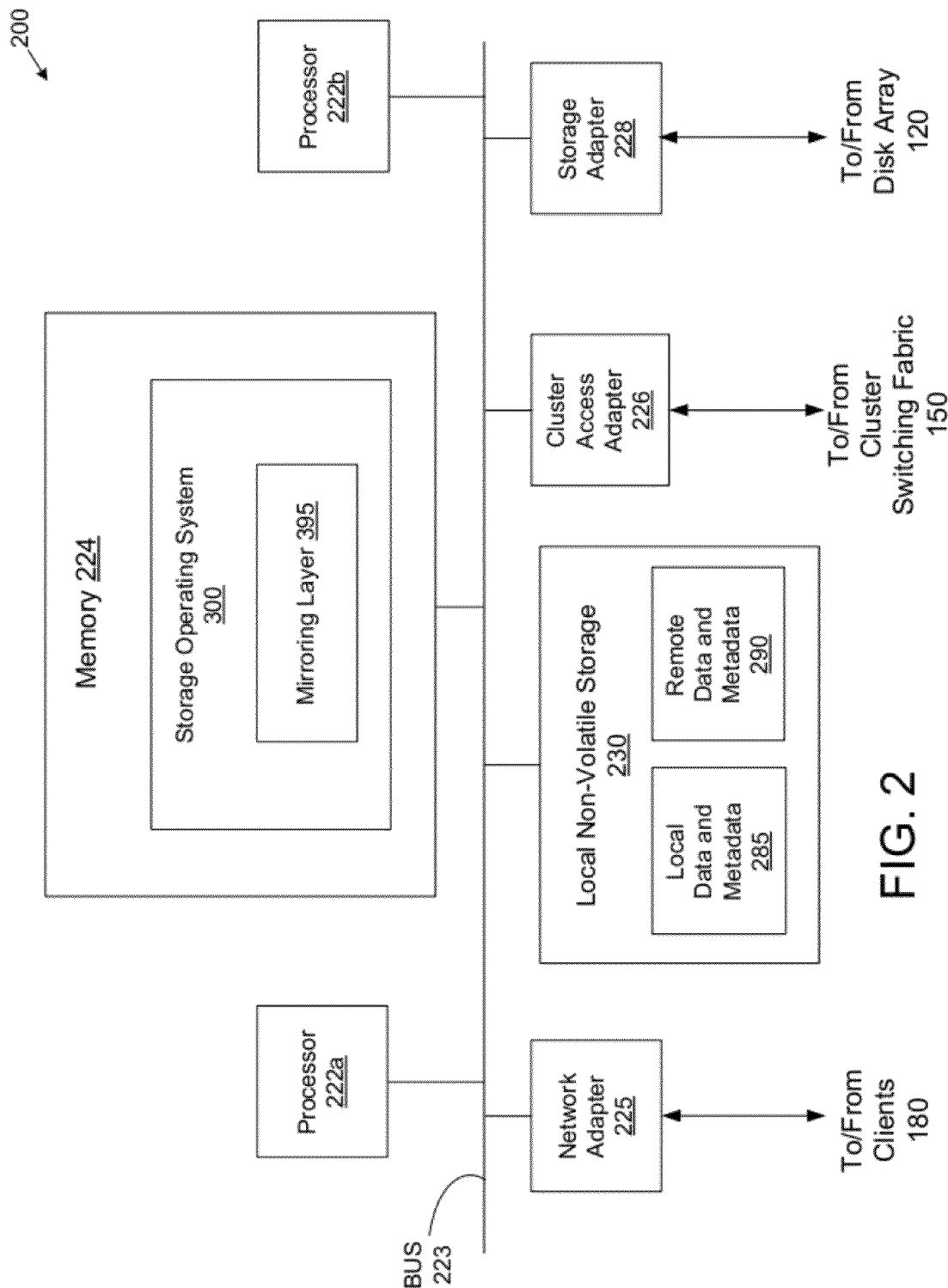
FIG. 2 is a schematic block diagram of an exemplary node that may be employed in the cluster environment.

FIG. 2 is a schematic block diagram of an exemplary node 200 that may be employed in the cluster environment of FIGS. 1A-B. A node 200 may be illustratively embodied as a storage system comprising a plurality of processors 222a,b, a memory 224, a network adapter 225, a cluster access adapter 226, a storage adapter 228 and local non-volatile storage device 230 interconnected by a system bus 223.

The cluster access adapter 226 comprises a plurality of ports adapted to couple the node 200 to other nodes of the cluster 100 through the cluster switching fabric 150. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-blade 310 on the node, while the other processor 222b executes the functions of the D-blade 350.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node 200 over the network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

The memory 224 illustratively comprises storage locations that are addressable by the processors and adapters for storing software program code and data used in some embodiments. The processors and adapters may, in turn, comprise processing elements and/or logic circuitry configured to execute the software code and manipulate the data stored in the memory 224. In some embodiments, the memory 224 may comprise a form of random access memory (RAM) comprising "volatile" memory that is generally cleared by a power cycle or other reboot operation.

The storage operating system 300, portions of which is typically resident in memory and executed by the processing elements, functionally organizes the node 200 by, inter alia, invoking storage operations in support of the storage services implemented by the node. It will be apparent to those skilled in the art that other processing and memory means, including various computer readable media, may be used for storing and executing program instructions pertaining to the invention described herein. In some embodiments, the storage operating system 300 comprises a plurality of software layers (including a mirroring layer/engine 395) that are executed by the processors.

The local non-volatile storage device 230 may comprise one or more storage devices utilized by the node to locally store data. The local non-volatile storage device 230 may be employed as a backup memory that ensures that the storage system does not "lose" received information, e.g., CIFS and NFS requests, in the event of a system shutdown or other unforeseen problem. In some embodiments, the non-volatile storage device 230 may comprise a rewritable computer memory for storing data that does not require power to maintain data/information stored in the computer memory and may be electrically erased and reprogrammed. Some examples of non-volatile storage devices include disks, flash memory, non-volatile storage device (NVRAM), Magnetic Random Access Memory (MRAM), Phase Change RAM (PRAM), etc. In other embodiments, other non-volatile storage devices are used other than those listed here.

In some embodiments, the local non-volatile storage device 230 may locally store various data and metadata from software layers or applications (referred to as "mirroring clients") executing on the node. For example, a mirroring client may comprise a software layer (e.g., file system layer or RAID layer) of a storage operating system executing on the node. In other embodiments, the mirroring client may comprise any other software layer or application that requests data and metadata to be stored to the local non-volatile storage device 230 and mirrored/stored to a remote non-volatile storage device 230 on a remote node. For storing data and metadata to the local non-volatile storage device 230, a mirroring client may send the data and metadata to software layers of the storage operating system that store the data and metadata using methods known in the art. For storing data and metadata to the remote non-volatile storage device 230, each mirroring client may also send a stream of data and metadata to the mirroring layer/engine 395 (sometimes referred to as an interconnect (IC) layer/engine) that mirrors/stores the data and metadata to the remote node using methods described herein.

II. Storage Operating System Having a Mirroring Layer

A. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the Data ONTAP® software operating system available from NetApp, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
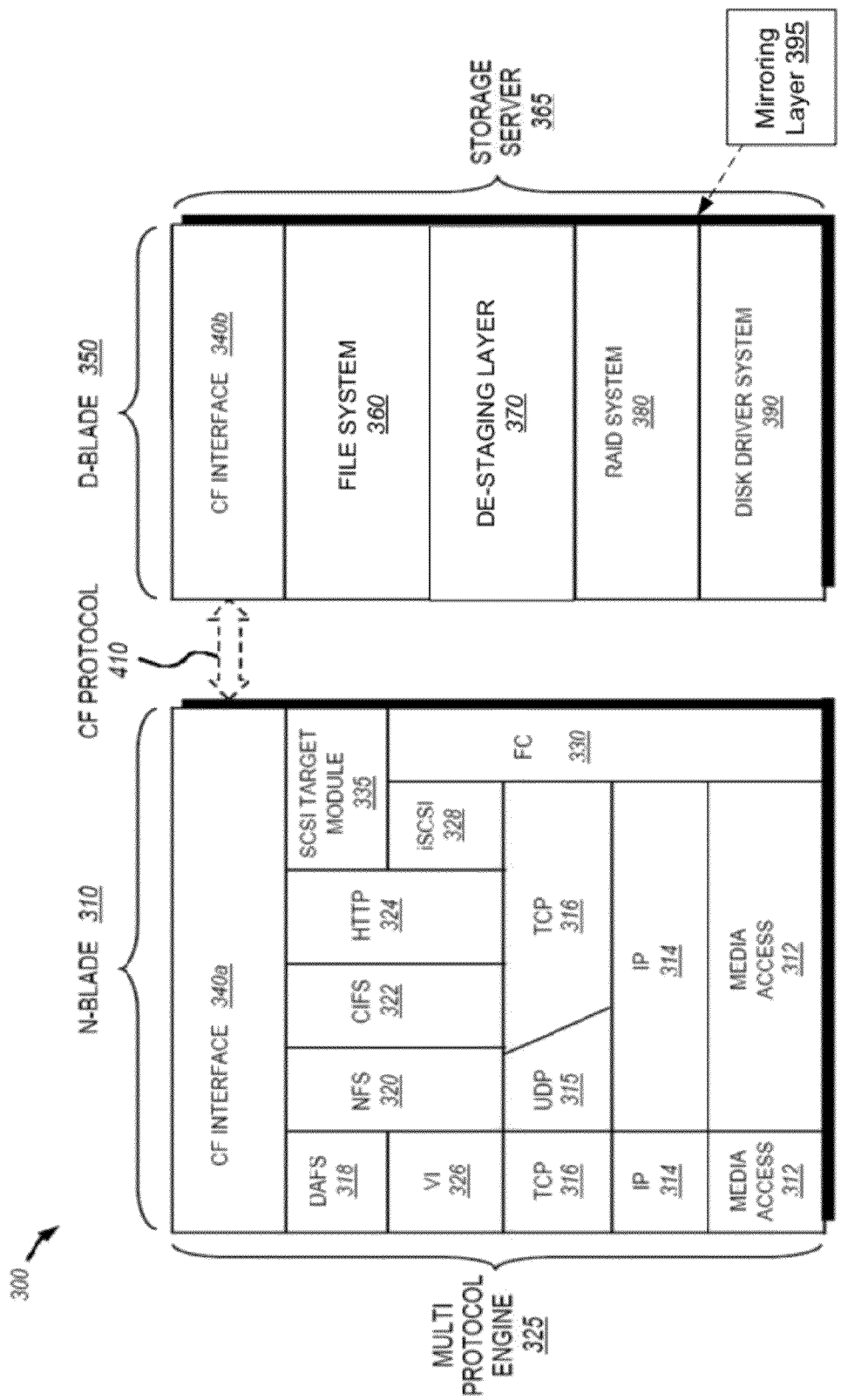
FIG. 3 is a schematic block diagram of an exemplary storage operating system that may be implemented by the node in FIG. 2.

FIG. 3 is a schematic block diagram of an exemplary storage operating system 300 that may be implemented by the node 200 in FIG. 2. The storage operating system 300 comprises a series of software layers organized to form an integrated network protocol stack or, more generally, a multi-protocol engine 325 (N-blade 310) that provides data paths for clients 180 to access data stored on the node 200 using block and file access protocols. The multi-protocol engine 325 includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315 (that comprise a transport layer).

A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system 300 includes a series of software layers organized to form a storage server 365 (D-blade 350) that provides data paths for accessing information stored on the disks 130 of the node 200. To that end, the storage server 365 includes a file system module 360, a de-staging layer 370, a storage/RAID system layer 380 and a disk driver system module 390. The RAID system layer 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that allocates storage space for itself in the disk array 120 and controls the layout of information on the array. The file system further provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file (data container) handle, i.e., an identifier that includes an inode number, is used to retrieve an inode from disk.

All inodes of the write-anywhere file system may be organized into the inode file. A file system (fs) info block specifies the layout of information in the file system and includes an inode of a data container, e.g., file, that includes all other inodes of the file system. Each logical volume (file system) has an fsinfo block that may be stored at a fixed or variable location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, an access request (read/write request) from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system produces operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the access request, the node 200 (and storage operating system 300) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system 300 can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

In some embodiments, the storage server 365 is embodied as D-blade 350 of the storage operating system 300 to service one or more volumes of array 120. In addition, the multi-protocol engine 325 is embodied as N-blade 310 to (i) perform protocol termination with respect to a client issuing incoming data access request packets over the network 140, as well as (ii) redirect those data access requests to any storage server 365 of the cluster 100. Moreover, the N-blade 310 and D-blade 350 cooperate to provide a highly-scalable, distributed storage system architecture of the cluster 100. To that end, each blade includes a cluster fabric (CF) interface module 340*a,b* adapted to implement intra-cluster communication among the blades (e.g., communication between blades of the same node or communication between blades of different nodes) using CF protocol messages.

For example, the protocol layers (e.g., the NFS/CIFS layers and the iSCSI/FC layers) of the N-blade 310 may function as protocol servers that translate file-based and block-based access requests from clients 180 into CF protocol messages used for communication with the D-blade 350. In some embodiments, the N-blade servers convert the incoming client access requests into file system primitive operations (commands) that are embedded within CF protocol messages by the CF interface module 340 for transmission to the D-blades 350 of the cluster 100. Notably, the CF interface modules 340 cooperate to provide a single file system image across all D-blades 350 in the cluster 100. Thus, any network port of an N-blade that receives a client request can access any data container within the single file system image located on any D-blade 350 of the cluster.

In some embodiments, the N-blade 310 and D-blade 350 are implemented as separately-scheduled processes of storage operating system 300. In other embodiments, the N-blade 310 and D-blade 350 may be implemented as separate software components/code within a single operating system process. Communication between an N-blade and D-blade in the same node 200 is thus illustratively effected through the use of CF messages passing between the blades. In the case of remote communication between an N-blade and D-blade of different nodes, such CF message passing occurs over the cluster switching fabric 150.

A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc.

The CF interface module 340 implements the CF protocol for communicating file system commands/messages among the blades of cluster 100. Communication is illustratively effected by the D-blade exposing the CF API to which an N-blade (or another D-blade) issues calls. To that end, the CF interface module 340 is organized as a CF encoder and CF decoder. The CF encoder of, e.g., CF interface 340*a* on N-blade 310 encapsulates a CF message as (i) a local procedure call (LPC) when communicating a file system command to a D-blade 350 residing on the same node 200 or (ii) a remote procedure call (RPC) when communicating the command to a D-blade residing on a remote node of the cluster 100. In either case, the CF decoder of CF interface 340*b* on D-blade 350 de-encapsulates the CF message and processes the file system command. As used herein, the term "CF message" may be used generally to refer to LPC and RPC communication between blades of the cluster.

In some embodiments, the storage operating system 300 also comprises a de-staging layer 370 that operates in conjunction with the file system 360 and other software layers of the storage operating system 300 to produce and store write logs to the local non-volatile storage device 230. In general, the de-staging layer 370 may receive write requests for files and perform the received write requests in two stages. In a first stage, write requests received by the file system layer 360 are sent to the de-staging layer 370. The de-staging layer 370 produces a write log for each received write request, a write log representing the write request. The write logs may be stored to the local non-volatile storage device 230. In a second stage, upon occurrence of a predetermined initiating event (referred to as a "consistency point"), accumulated local write logs stored in the local volatile storage device may be performed on the storage devices. To do so, the accumulated local write logs may be sent to the RAID system layer 380 that then performs the write logs. The consistency point may be initiated by various predetermined initiating events such as the occurrence of a predetermined time interval, etc.

In some embodiments, the storage operating system 300 also comprises a mirroring layer 395 that may reside underneath the storage/RAID system layer 380 and be a peer layer of the disk driver system layer 390, as shown in FIG. 3. In other embodiments, the mirroring layer 395 may reside near other layers of the storage operating system 300. In some embodiments, the mirroring layer 395 may be pre-included in storage operating system 300 software. In other embodiments, the mirroring layer 395 may comprise an external auxiliary plug-in type software module that works with the storage operating system 300 to enhance its functions.

B. Mirroring Layer

To ensure data consistency and provide failover protection, the write logs may be stored to the local non-volatile storage device 230 (as described above) and also be mirrored/stored to a remote non-volatile storage device 230 at a remote partner node. The file system 360 and/or the de-staging layer 370 may comprise mirroring clients that utilize and request data mirroring services of the mirroring layer 395. In some embodiments described below, the file system 360 may comprise a mirroring client that produces the write logs, the write logs comprising the data and metadata that are to be mirrored/stored to the remote non-volatile storage device 230 for illustrative purposes only. In other embodiments, other mirroring clients may use the mirroring layer 395 and/or produce other types of data and metadata, other than write logs, that are to be mirrored/stored to the remote non-volatile storage device 230 by the mirroring layer 395.

As used herein, a mirroring client executing on a local node (e.g., local node A) may produce "local" data and metadata 285 stored to the local non-volatile storage device 230. The mirroring client may also send its local data and metadata 285 to the mirroring layer/engine 395 for storing to a remote node (e.g., remote node B), using methods described herein. Likewise, a mirroring client on the remote node may send its data and metadata (shown as "remote" data and metadata 290) to its mirroring layer/engine 395 for storing to the local non-volatile storage device 230 of the local node, using methods described herein.

The mirroring layer/engine 395 may transmit the data and metadata 285 of the local node to the remote node using the cluster switching fabric 150. The cluster switching fabric 150 may utilize any type of network connection, switches, and/or protocols known in the art. For example, the cluster switching fabric 150 may comprise a Fibre Channel interconnect using Fibre Channel fabric switches, an Ethernet interconnect using Gigabit Ethernet switches and Ethernet clustering protocol, etc. In some embodiments, the cluster switching fabric 150 may provide multiple network connection paths between two nodes 200 in the cluster 100. The multiple connection paths may be provided through multiple hardware connections between the nodes. Multiple connection paths may be implemented to increase data throughput and bandwidth between the nodes. However, use of multiple connection paths between nodes 200 may result in OOD of data transfer between the nodes.

C. Data Mirroring Using IOD and OOD

Figure 4A:
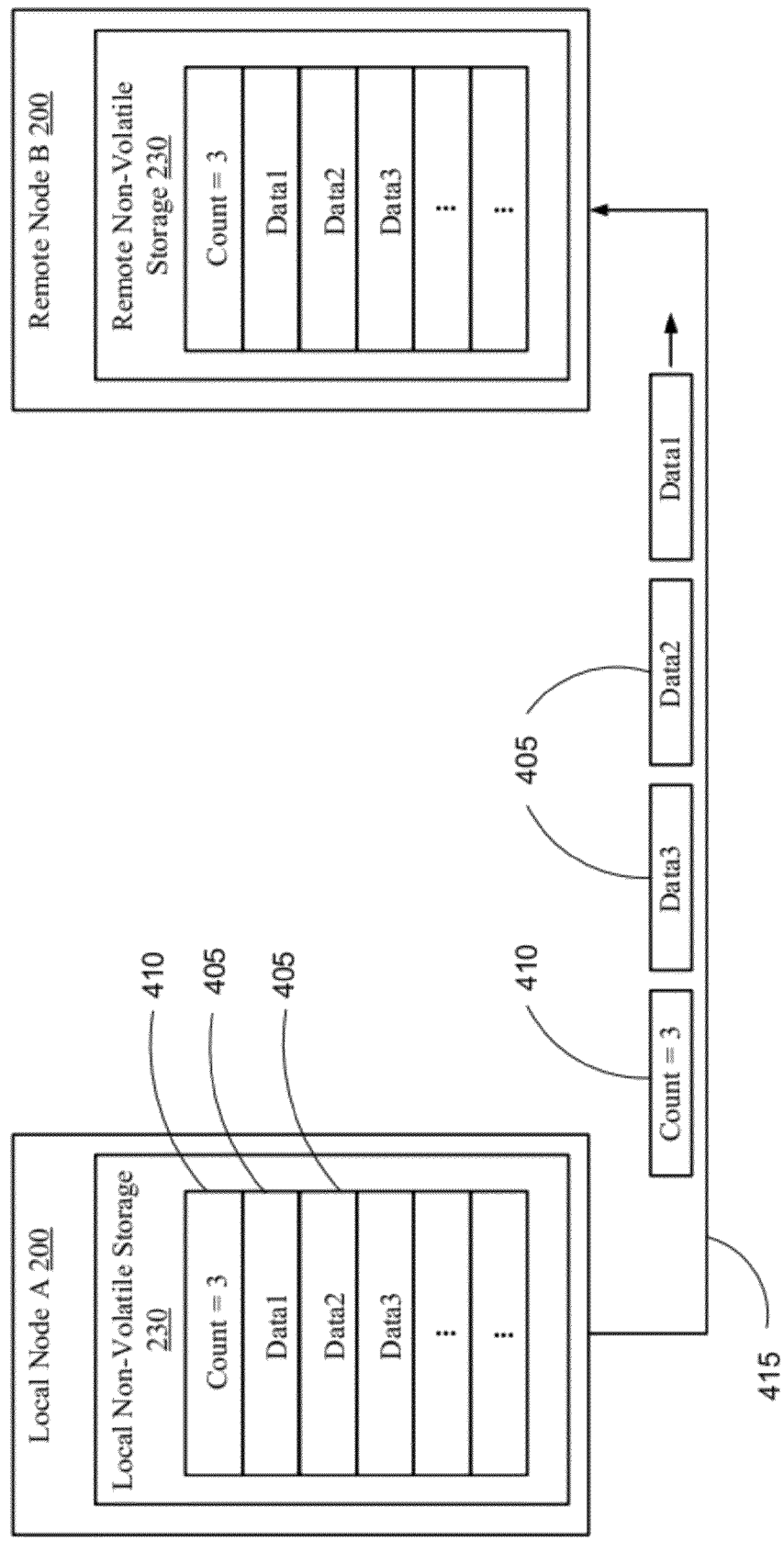
FIGS. 4A-B show conceptual diagrams illustrating conventional IOD of data and metadata between a local node and remote node.
Figure 4B:
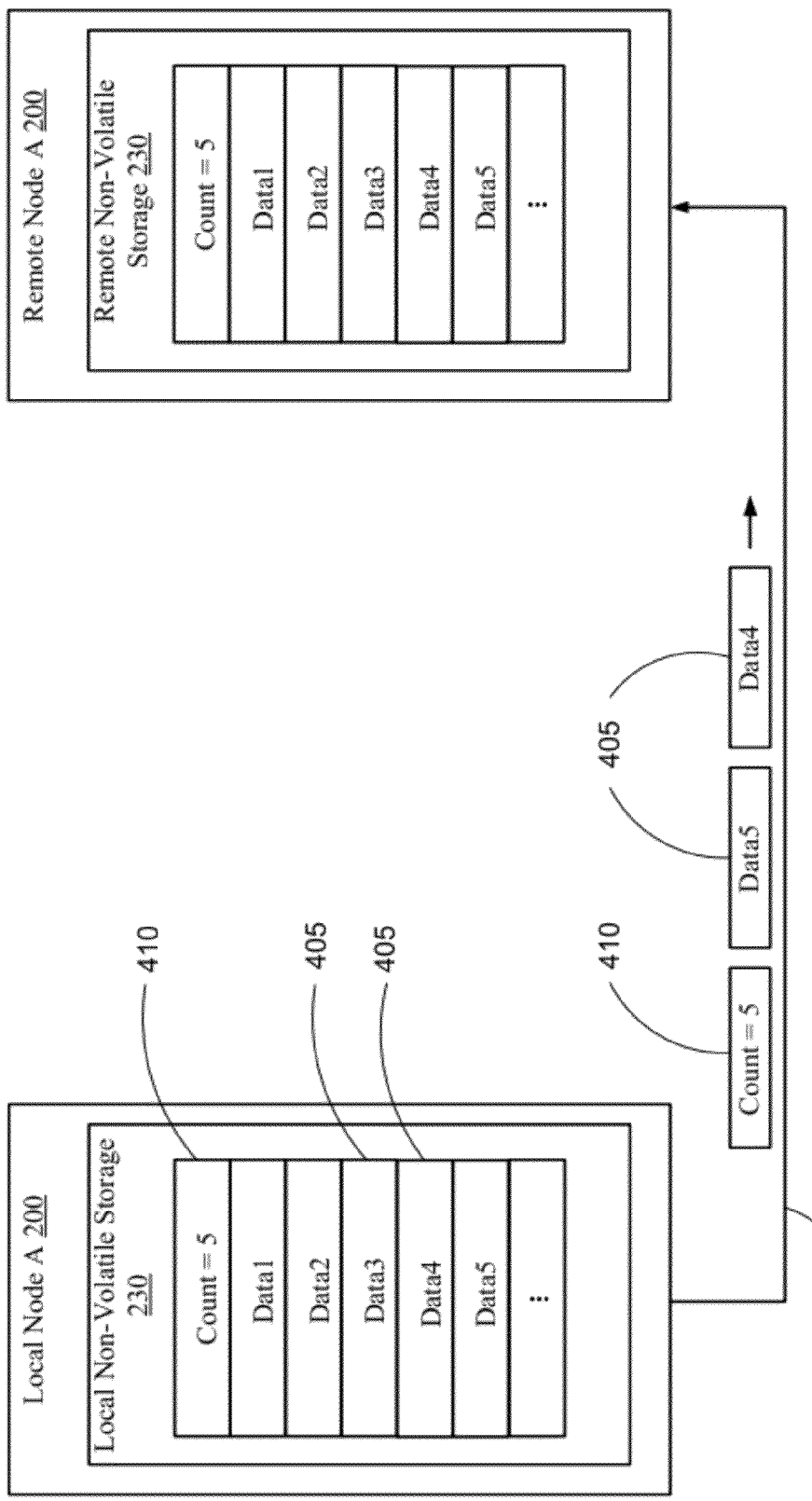

Currently, remote mirroring of data implements an "in-order delivery" (IOD) requirement, whereby the data is expected to be received at the remote node in the same time order as it was sent at the local node. FIGS. 4A-B show conceptual diagrams illustrating conventional IOD of data and metadata between a local node and remote node. As shown in FIG. 4A, a local node A 200 comprises a local non-volatile storage device 230 storing various data sets 405 and metadata sets 410.

In the examples of FIGS. 4A-B, the local non-volatile storage device 230 stores a first related group comprising data sets Data1, Data2, and Data3 and metadata set Count=3 and a second related group comprising data sets Data4 and Data5 and metadata set Count=5. The data sets 405 and metadata sets 410 may be stored to the local non-volatile storage device 230 by a mirroring client (e.g., software layer or application) executing on the local node A. A data set 405 may comprise user/client data sent from a user/client (such as an application) to the mirroring client. As such, a data set 405 is typically not produced by the mirroring client. A metadata set 410 may comprise metadata that describes one or more data sets 405. Metadata sets 410 may be produced by the mirroring client to assist in processing the data sets 405.

Note that the metadata sets are typically stored to the same predetermined storage location in the local and remote non-volatile storage devices 230. As such, any new received metadata set typically overwrites/updates the prior received metadata set at the same predetermined storage location in the local and remote non-volatile storage devices 230. This is shown in FIG. 4B where the new metadata set Count=5 has overwritten the previous metadata set Count=3 in the same storage location in the local and remote non-volatile storage devices 230.

The mirroring client may also send the data sets 405 and metadata sets 410 to a conventional mirroring layer 395 (executing on the local node A) for storing to the remote non-volatile storage device 230 on the remote node B. The mirroring layer 395 may typically transmit the data sets 405 and metadata sets 410 to the remote node B through a single connection path 415 between the local and remote nodes using IOD. As such, the data and metadata sets are expected to be received at the remote node B in the same time order as it was sent at the local node A.

In the example of FIG. 4A the data and metadata sets are transmitted from the local node A in the following time order: Data1 is sent first, Data2 is sent second, Data3 is sent third, and Count=3 is sent fourth. As such, the data and metadata sets are received and stored to the remote storage 230 at the remote node B in the following time order: Data1 is received and stored first, Data2 is received and stored second, Data3 is received and stored third, and Count=3 is received and stored fourth. Similarly, in the example of FIG. 4B, the data and metadata sets are transmitted from the local node A in the following time order: Data4, Data5, and then Count=5; then the data and metadata sets are received and stored at the remote node B in the same time order: Data4, Data5, and then Count=5.

As such, IOD of data provides data integrity at the remote node B at any given point in time. As used herein, "data integrity" at the remote node B may exist when the metadata set of a related group is written to the remote non-volatile storage device 230 only after each of the data sets within the related group is written to the remote non-volatile storage device. If the metadata set of a related group is written before each of the data sets within the same related group is written, data corruption and inconsistency in the remote non-volatile storage device may result.

For example, the mirroring client may comprise the file system 360 that writes data 405 and metadata 410 to the local non-volatile storage device 230 and also sends the data 405 and metadata 410 to the mirroring layer 395 for mirroring/storing to the remote non-volatile storage device 230. In this example, file system 360 may periodically produce metadata sets to assist in tracking the data sets it produces. The metadata "Count" may specify the number of valid client data sets that have been produced so far by the file system 360 for storage to the local and remote non-volatile storage devices 230. As such, the metadata set Count=3 specifies that 3 valid client data sets (Data1, Data2, and Data3) have been produced so far for storage to the local and remote non-volatile storage devices 230. When 2 more valid client data sets (Data4 and Data5) are later produced by the file system 360, the file system 360 may then produce an updated metadata set Count=5 to indicate that a total of 5 valid client data sets (Data1-Data5) have been produced so far.

Typically, the metadata sets may also be used to track the total number of valid data sets that have been successfully stored thus far to the local and remote non-volatile storage devices 230. As such, the current metadata set stored at the predetermined metadata storage location in the local and remote non-volatile storage devices 230 should accurately reflect the total number of valid data sets successfully stored thus far. For example, if the metadata set Count=5 is overwritten/updated to the predetermined metadata storage location in the remote non-volatile storage device 230, there should be a total of 5 valid data sets successfully stored thus far to the remote non-volatile storage device 230 already. This may be referred to as data integrity at the remote node where the data and metadata is consistent at the remote node.

As described above, data integrity at the remote node may also be defined as existing when the metadata set (e.g., Count=3) of a related group is written to the remote non-volatile storage device 230 only after each of the data sets (e.g., Data1-Data3) within the related group is written to the remote non-volatile storage device. A "related group" of data and metadata sets may comprise one or more data sets (e.g., Data1-Data3) and one metadata set (e.g., Count=3) that describes and is associated with each of the one or more data sets.

In some embodiments, the metadata set of a related group may be caused to be produced by the mirroring client by the production of the data sets of the related group. For example, the production of metadata set Count=5 by the mirroring client is caused by the production of data sets Data4 and Data5 by the mirroring client, whereby data sets Data4 and Data5 and metadata set Count=5 comprise a related group.

In further embodiments, a related group may include one or more data sets that are received by the mirroring layer 395 (from the mirroring client) next after a previous metadata set (that is not in the related group) and also include a following metadata set (that is in the related group) received by the mirroring layer 395 next after the one or more data sets. For example, the second related group comprises data sets Data4 and Data5 that are received by the mirroring layer 395 next just after the previous metadata set Count=3 (that is not in the related group) and also includes the following metadata set Count=5 (that is in the related group) received next just after data sets Data4 and Data5.

In some examples described herein, the mirroring client comprises the file system 360 and the data 405 and metadata 410 pertains to write logs. In other embodiments, the mirroring client may comprise another software layer or application and the data 405 and metadata 410 may not pertain to write logs. For example, the mirroring client may comprise the RAID system layer 380 and the data 405 may comprise client data and the metadata 410 may comprise parity data. For example, a first related group may comprise data sets Data1, Data2, and Data3, and a metadata set comprising a checksum of Data1, Data2, and Data3; a second related group may comprise data sets Data4 and Data5, and a metadata set comprising a checksum of Data4 and Data5.

Each mirroring client may produce and send its own separate stream of data and metadata to the mirroring layer 395 for processing, the stream comprising related groups of data and metadata. As such, related groups of data and metadata will be produced and received from the same mirroring client. The storage size for the data and metadata sets typically vary depending on how the mirroring client produces the data and metadata sets, although there is typically a maximum storage size to a single data or metadata set (e.g., 64 KB).

As described above, data integrity at the remote node is kept intact using IOD. When multiple connection paths between the local and remote nodes are used to increase data throughput and bandwidth, however, OOD of data may result which may compromise data integrity at the remote node. For use of OOD is remote mirroring of data, the data is not expected to be received at the remote node in the same time order as it was sent at the local node and may arrive in any order. For example, in FIG. 4A, metadata set Counter=3 may be received at the remote node B prior to data sets Data2 and Data3. As such, metadata set Counter=3 will be stored to the remote non-volatile storage device 230 prior to data sets Data2 and Data3. As a result, data corruption and inconsistency at the remote non-volatile storage device 230 occurs.

III. Providing Data Integrity in OOD Remote Mirroring

In some embodiments, methods and apparatus are described that provide remote mirroring/storing of data and metadata using OOD (over multiple connection paths), while also maintaining data integrity at the remote node at any given point of time. In some embodiments, a mirroring layer 395 of a storage operating system 300 executing on the local node may be configured to perform embodiments described herein.

In some embodiments, the mirroring layer does so by producing a data and metadata request (DMR) data structure for each mirroring client sending data and metadata sets to the mirroring layer. The mirroring layer may treat each received data and metadata set as a request (having a unique request identifier "XID") from the mirroring client to mirror/store the data or metadata set to the remote node. The mirroring layer may queue/store each received data and metadata set/request to the DMR data structure for the mirroring client. In some embodiments, the mirroring layer then transmits data sets/requests from the DMR data structure to the remote node for storage to the remote non-volatile storage device. In these embodiments, the mirroring layer may delay transmitting the metadata sets/requests from the DMR data structure to the remote node until each related data set/request in the related group of the metadata set/request has been completed (i.e., successfully stored to the remote non-volatile storage device). By doing so, data integrity may be provided at the remote node in OOD of data and metadata.

Typically, each mirroring client will continually query the mirroring layer to determine if its data and metadata sets/requests sent to the mirroring layer have been completed. The mirroring layer may also produce a request field/variable ("last_complt_request") for indicating the request identifiers (XIDs) of sets/requests that have been currently completed thus far. In some embodiments, the mirroring layer may update the value of the request field/variable in a manner that makes the OOD of data and metadata transparent to the mirroring client.

In some embodiments, the mirroring layer 395 may perform remote mirroring using OOD while maintaining data integrity at the remote node, without use of a processor 222 executing on the remote node. In these embodiments, the mirroring layer 395 may perform the remote mirroring using remote direct memory access (RDMA) methods without requiring use or involvement of a processor 222 of the remote node. As known in the art, RDMA comprises a communications protocol that provides transmission of data from the memory (e.g., local non-volatile storage device 230) of one computer (e.g., local node A) to the memory (e.g., remote non-volatile storage device 230) of another computer (e.g., remote node B) without involving the processor of the other computer. While other methods using OOD for remote mirroring may require the processor of the remote node to re-assemble data and metadata received out-of-order at the remote node to provide data integrity, embodiments described herein may not require such re-assembly of data and metadata and/or the use of the processor of the remote node.

Figure 5:
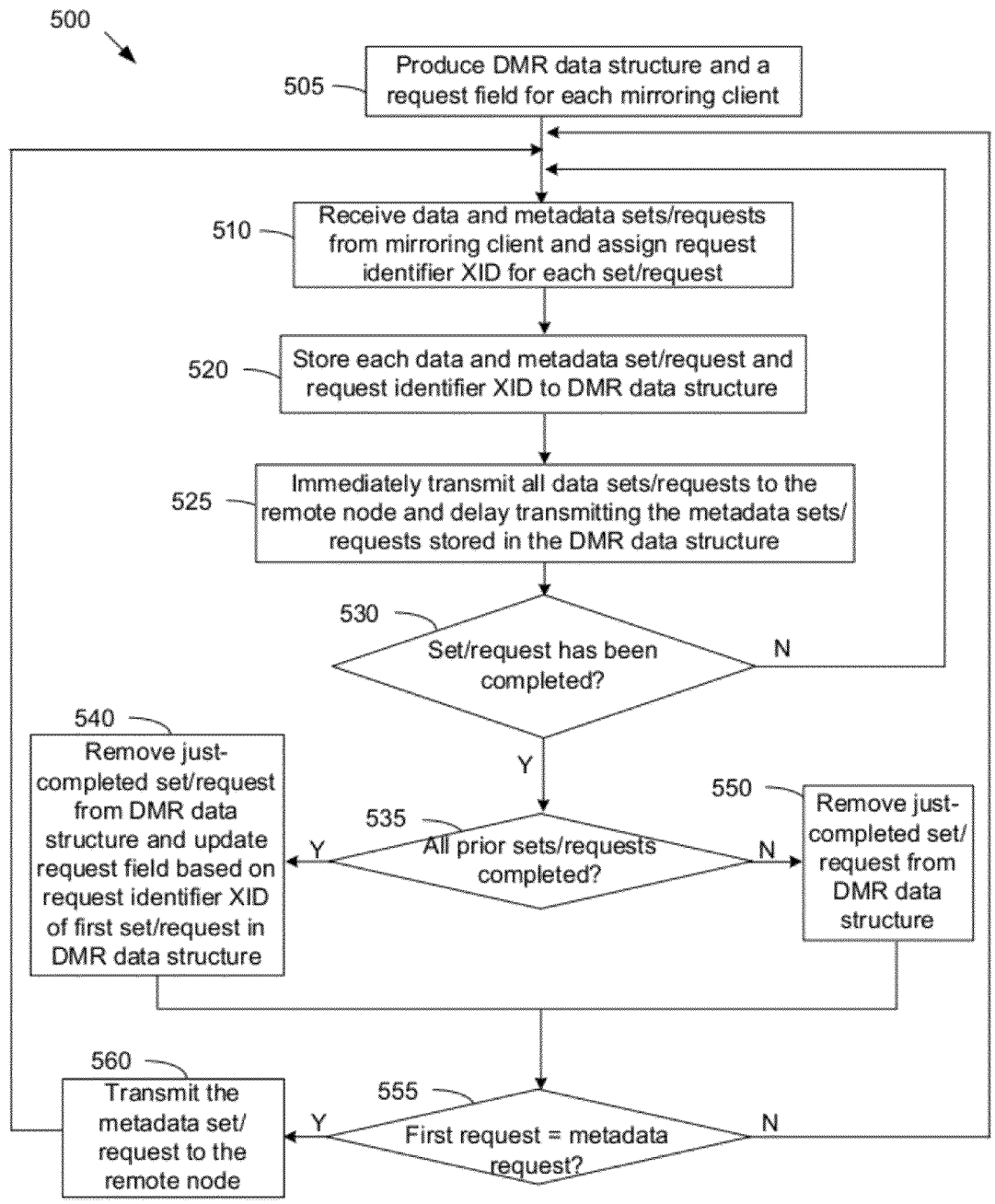
FIG. 5 is a flowchart of a method for remote mirroring of data and metadata from a local node to a remote node of a cluster using OOD.

FIG. 5 is a flowchart of a method 500 for remote mirroring of data and metadata from a local node to a remote node of a cluster 100 using OOD. Some steps of the method 500 are described and conceptually illustrated in relation to FIGS. 6-7. In some embodiments, some of the steps of the method 500 are implemented by software or hardware. In some embodiments, some of the steps of method 500 are performed by the mirroring layer/engine 395 residing and executing on the operating system of a local node 200. The mirroring layer/engine 395 may perform the method 500 in conjunction with other software layers of the operating system. In some embodiments, the remote node comprises a predetermined failover partner node of the local node. The order and number of steps of the method 500 are for illustrative purposes only and, in other embodiments, a different order and/or number of steps are used.

The mirroring layer/engine 395 may concurrently perform the method 500, in parallel, for each mirroring client that sends data and metadata sets to the mirroring layer/engine 395 for mirroring/storing the data and metadata sets to the remote node. The mirroring client may comprise, for example, a software layer of the storage operating system 300 or any application executing on the local node. Some mirroring clients may send data and metadata sets that may or may not require IOD of the data and metadata sets to the remote node. For example, the file system 360 and RAID system 380 mirroring clients may require IOD of the data and metadata sets. Other mirroring clients, however, may not require IOD and OOD of the data and metadata sets is allowable. The mirroring layer 395 may process data and metadata sets from mirroring clients requiring or not requiring IOD in accordance with embodiments described herein.

For each mirroring client that sends data and metadata sets to the mirroring layer/engine 395, the method 500 produces and maintains (at 505) a DMR data structure and a request field/variable ("last_cmplt_request"). In general, the DMR data structure may be used to queue/store data and metadata sets/requests received from the mirroring client. The request field may be used to indicate currently completed requests of the mirroring client at the remote node and be used to respond to completion queries from the mirroring client (discussed further below).

Figure 6:
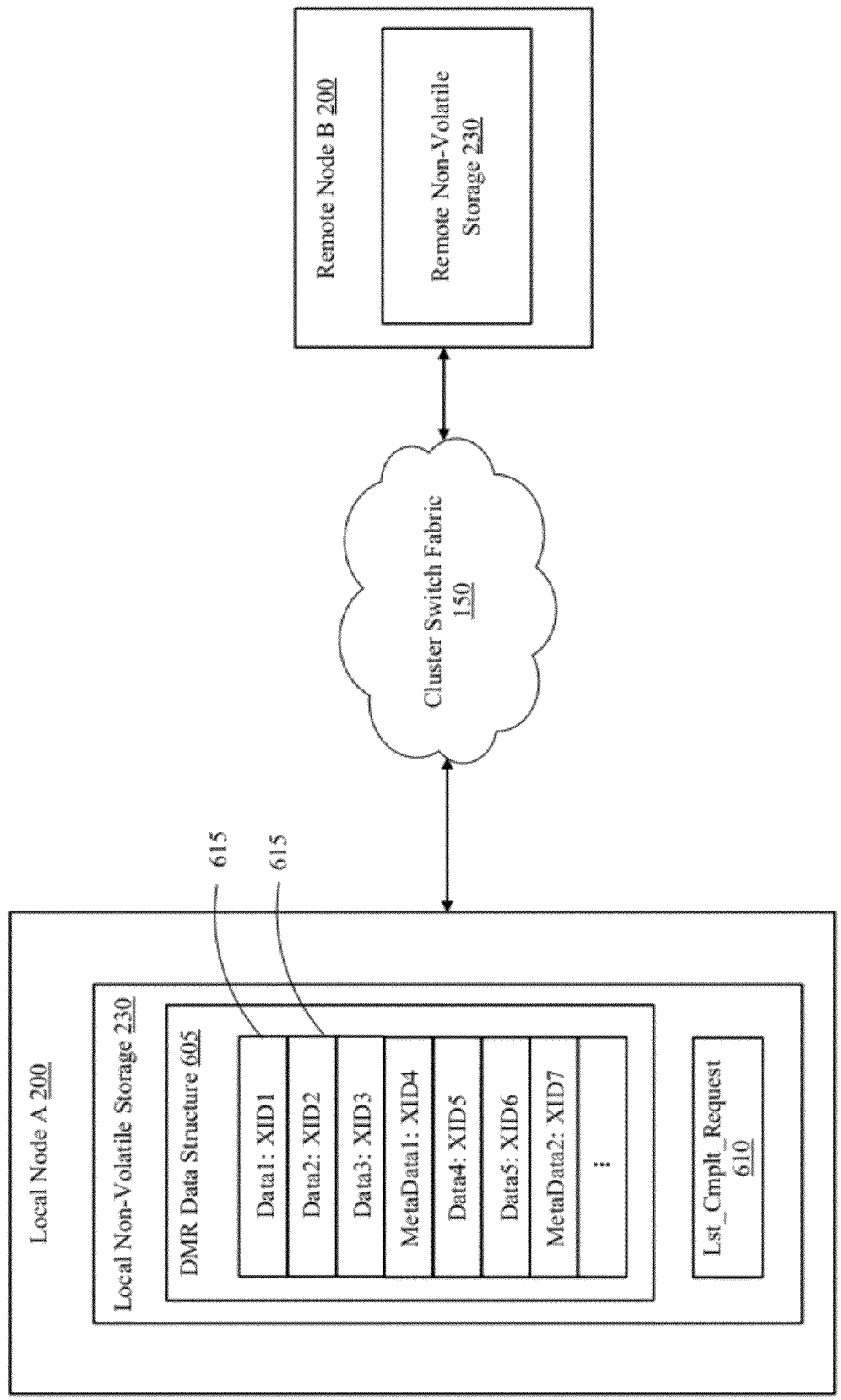
FIG. 6 shows a conceptual diagram of a local node A having an exemplary DMR data structure and request field.

FIG. 6 shows a conceptual diagram of a local node A 200 having an exemplary DMR data structure 605 and request field/variable ("last_cmplt_request") 610 that is stored in the local non-volatile storage device 230. In other embodiments, the DMR data structure 605 and the request field 610 may be stored elsewhere on the local node (e.g., in memory 224, etc.). The request field 610 may be initialized to a null value (e.g., 0). FIG. 6 also shows that the local node A 200 is connected with a remote node B, having a remote non-volatile storage device 230, through a cluster switch fabric 150 that provides multiple data connection paths between local node A and remote node B.

The method 500 receives (at 510) a plurality of data and metadata sets/requests from the mirroring client. The received data and metadata sets may comprise one or more related groups, each related group comprising one or more data sets and one metadata set that describes and is associated with each of the one or more data sets in the related group. Each received data set or metadata set may comprise a data request or metadata request, respectively, from the mirroring client for the mirroring layer to mirror/store the data or metadata set to the remote node. The method 500 also generates and assigns (at 510) a unique request identifier (XID) for each received data and metadata set/request. In some embodiments, the request identifiers may comprise increasing sequential numbers (e.g., 1, 2, 3 . . . ) that are assigned to the received data and metadata sets/requests in the time order they are received. In some embodiments, a request having a lower request identifier (XID) is received before another request having a higher request identifier (XID). As such, the request identifiers may indicate the time ordering of when requests were received by the method 500 relative to each other.

The method 500 stores (at 520) each received data and metadata set/request, along with the assigned request identifier XID, to the DMR data structure 605. Each data and metadata set/request and assigned request identifier may comprise an entry 615 in the DMR data structure 605. In some embodiments, the method 500 may store the data and metadata sets/requests to the DMR data structure 605 based on the time order they are received, where an earlier received set/request is stored to a higher entry in the data structure than a later received set/request. For example, the method may fill the DMR data structure 605 beginning from a first/top entry 615 to a last/bottom entry 615. In some embodiments, a higher entry in the DMR data structure 605 may comprise a request received before another request in a lower entry in the DMR data structure 605. As such, the entry positions of the data and metadata requests in the DMR data structure 605 may indicate the time ordering of when the requests were received by the method 500 relative to each other.

FIG. 6 shows a conceptual diagram of exemplary data and metadata sets/requests stored in entries 615 of the DMR data structure 605. The data and metadata sets/requests may comprise a first related group comprising data sets Data1, Data2, and Data3, and metadata set Metadata1 (Count=3), and also comprise a second related group comprising data sets Data4 and Data5, and metadata set Metadata2 (Count=5). The method 500 has generated and assigned request identifiers according to the time order the requests are received, such as: Data1: XID1, Data2: XID2, Data3: XID3, Metadata1: XID4, Data4: XID5, Data5: XID6, Metadata2: XID7, etc. The method 500 has also stored the requests to the DMR data structure 605 according to the time order the requests are received, so that the first received Data1: XID1 is stored to a first/top entry 615 and the later received Data4: XID5 is stored to a lower entry 615 in the DMR data structure 605.

The method 500 then transmits (at 525) all data sets/requests currently stored in the DMR data structure 605 (that has not already been transmitted) to the remote node B 200 for storage to the remote non-volatile storage device 230. Note that transmitting a data set/request in the DMR data structure 605 does not remove/delete the data set/request from the DMR data structure 605. In some embodiments, the method 500 may delay transmitting the metadata sets/requests currently stored in the DMR data structure 605 to the remote node until each related data set/request in the related group of the metadata set/request has been completed. By doing so, data integrity may be provided at the remote node in OOD of data and metadata.

In some embodiments, the method 500 may transmit (at 525) the data sets/requests in a time order based on the entry position of the data sets/requests in the DMR data structure 605. For example, the method 500 may transmit the data sets/requests beginning from the top entry 615 to the lower entries 615 of the DMR data structure 605. As such, in some embodiments, the method 500 may transmit the requests in the DMR data structure 605 in a First In, First Out (FIFO) manner, where the request that comes in first is handled first, etc. In some embodiments, the method 500 may transmit (at 525) data sets/requests of different related groups in parallel. For example, the method 500 may transmit Data1: XID1, Data2: XID2, and Data3: XID3 in parallel with Data4: XID5 and Data5: XID6. In these embodiments, beginning the transmitting of data sets/requests does not depend on the completion of other data sets, whether in the same or different related groups.

The method 500 then determines (at 530) whether a data or metadata set/request has been completed (i.e., successfully stored to the remote non-volatile storage device 230 on the remote node B 200). The method 500 may determine such by determining whether a request-completion acknowledgement has been received from the remote node B. Typically, the remote node will receive the data and metadata sets/requests from the local node, and upon completing the storing of a particular data or metadata set/request to the remote non-volatile storage device 230, will transmit a request-completion acknowledgement to the local node indicating that the particular data or metadata set/request is completed. For example, the transport layer (low level driver) of the remote node may transmit the request-completion acknowledgements to the local node. The request-completion acknowledgement may include the request identifier XID of the data or metadata set/request that has just been completed (referred to as the just-completed set/request).

If the method 500 determines (at 530—No) that a data or metadata set/request has not been completed (a request-completion acknowledgement has not been received), the method proceeds to step 510 where it continues to receive data and metadata sets from the mirroring client. If the method 500 determines (at 530—Yes) that a data or metadata set/request has been completed (a request-completion acknowledgement has been received), the method then determines (at 535), whether all sets/requests received by the method 500 prior to the just-completed request (i.e., all sets/requests having request identifiers XIDs that are lower than the request identifier XID of the just-completed request) are already completed. In some embodiments, the method may do so by determining whether the just-completed request is the first/top request in the DMR data structure 605 (by examining the request identifier XID of the first/top request in the DMR data structure). If so, this indicates that all sets/requests (having lower request identifiers) received prior to the just-completed request are already completed.

If the method determines (at 535—Yes) that all prior sets/requests are completed, the method 500 then removes/deletes (at 540) the just-completed data or metadata set/request from the DMR data structure 605 (e.g., by locating and deleting the entry 615 having the same request identifier as the just-completed set/request). The method also updates/overwrites (at 540) the request field ("last_cmplt_request") based on the request identifier XID of the first/top data or metadata set/request in the DMR data structure 605. In some embodiments, the request field ("last_cmplt_request") is updated using the following equation: last_cmplt_request=(XID of first set/request)−1. The method 500 then proceeds to step 555.

If the method determines (at 535—No) that all prior sets/requests are not completed, the method 500 removes/deletes (at 550) the just-completed data or metadata set/request from the DMR data structure 605, but does not update the request field ("last_cmplt_request"). The method 500 then proceeds to step 555.

The method determines (at 555) whether the first/top request in the DMR data structure 605 is a metadata set/request. If not, the method 500 proceeds to step 510 where it continues to receive data and metadata sets from the mirroring client. If so, the method transmits (at 560) the metadata set/request (that comprises the first request in the DMR data structure) to the remote node B 200 for storage to the remote non-volatile storage device 230. Note that transmitting a metadata set/request in the DMR data structure 605 does not remove/delete the metadata set/request from the DMR data structure 605. By delaying transmission of the metadata set/request to the remote node B until the metadata set/request is the first/top request in the DMR data structure 605 ensures that all related data sets/requests in the same related group have already been completed, thus providing data integrity at the remote node. The method 500 then proceeds to step 510.

Figure 7:
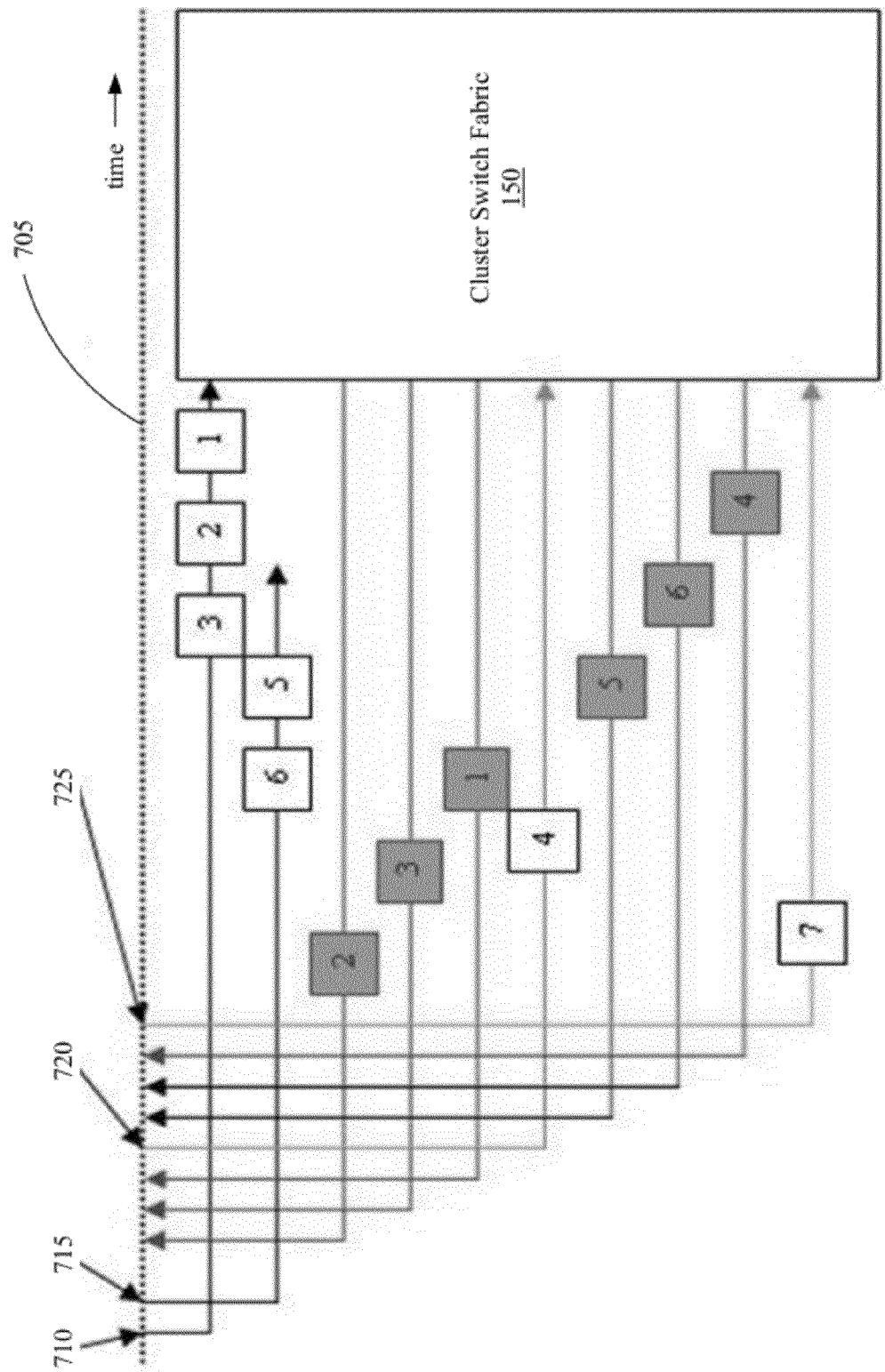
FIG. 7 shows a conceptual diagram of an exemplary time line of events and operations performed by the mirroring layer.

FIG. 7 shows a conceptual diagram of an exemplary time line of events and operations performed by the mirroring layer. In the example of FIG. 7, a time line 705 shows the time ordering of various events and operations 710-725 relative to each other as performed by the mirroring layer at the local node.

FIG. 7 shows un-shaded boxes (numbered 1-7) on arrowed lines pointing towards the cluster switch fabric 150. The un-shaded boxes may represent data and metadata sets/requests transmitted to the remote node through the cluster switch fabric 150 and the numbers within the un-shaded boxes comprise the request identifiers (XIDs) of the sets/requests. FIG. 7 also shows shaded boxes (numbered 1-7) on arrowed lines pointing from the cluster switch fabric 150. The shaded boxes may represent request-completion acknowledgements received from the remote node B through the cluster switch fabric 150. The numbers within the shaded boxes comprise the request identifiers (XIDs) of the sets/requests that have been successfully stored to the remote node.

FIG. 7 shows a first time event 710 where data sets/requests having request identifiers 1, 2, and 3 are transmitted to the remote node and transmission of the metadata set/request having request identifier 4 is delayed. A second time event 715 occurs where data sets/requests having request identifiers 5 and 6 are transmitted to the remote node and transmission of the metadata set/request having request identifier 7 is delayed. Note that FIG. 7 shows data sets/requests from different related groups being transmitted in series for illustrative purposes only. In other embodiments, the data sets/requests of different related groups may be transmitted in parallel.

FIG. 7 shows a third time event 720 where request-completion acknowledgements have been received from the remote node for data sets/requests 1-3 in an OOD manner (where the request-completion acknowledgements were received first for 2, then 3, then 1). At the third time event 720, since request-completion acknowledgements have been received for data sets/requests 1-3, the metadata set/request 4 is transmitted to the remote node. At this time point, data sets/requests 1-3 may be removed from the DMR data structure and the request field 610 may be updated to equal 3 (since metadata set/request 4 is currently the first request in the DMR data structure).

A fourth time event 725 occurs where request-completion acknowledgements have been received for data sets/requests 5 and 6 and metadata set/request 4, and the metadata set/request 7 is then transmitted to the remote node. At this time point, sets/requests 1-6 may be removed from the DMR data structure and the request field 610 may be updated to equal 6 (since metadata set/request 7 is currently the first request in the DMR data structure). The value of the request field 610 may be used to indicate currently completed requests of the mirroring client at the remote node and be used to respond to completion queries from the mirroring client (discussed further below).

Typically, each mirroring client will continually submit completion queries to the mirroring layer to determine if its data and metadata sets/requests sent to the mirroring layer have been completed (i.e., stored to the remote node). The mirroring layer may produce the request field for indicating the request identifiers of sets/requests that have been currently completed thus far. Each completion query may contain a request identifier for a prior submitted set/request, and the mirroring layer may respond to the completion query based on the request identifier value stored in the request field. For example, if the request identifier in the completion query is less than or equal to the request identifier value stored in the request field, the mirroring layer may send a response to the mirroring client indicating that the set/request having the request identifier has been completed.

In some embodiments, the mirroring layer may update the value of the request field in a manner that makes the OOD of data and metadata transparent to the mirroring client. As described above, the value of the request field is only updated after a set/request is just completed (at step 530 of method 500) and it is determined (at step 535) that all prior sets/requests (i.e., all sets/requests having request identifiers XIDs that are lower than the request identifier XID of the just-completed request) are already completed. Updating the value of the request field in this manner conceals the OOD of data and metadata from the mirroring client in respect to responding to their completion queries. Thus, the OOD of data and metadata will be transparent to the mirroring client.

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A system for storing data and metadata from a local node to a remote node, the system comprising:
    the local node comprising a mirroring engine configured for:
        receiving a plurality of data and metadata sets from a mirroring client, each received data or metadata set comprising a data or metadata request from the mirroring client to store the data or metadata set to the remote node, the received data and metadata sets comprising at least one related group, each related group comprising one or more data sets and one metadata set that describes and is associated with each of the one or more data sets in the related group;
        storing received data and metadata sets to a data structure according to a time order the data and metadata sets are received;
        transmitting each data set to the remote node through a switching fabric that provides multiple connection paths between the local and remote nodes that results in out-of-order delivery (OOD) of data between the local and remote nodes;
        transmitting each metadata set, stored in the data structure, to the remote node through the switching fabric only after each data set in its related group is successfully stored to the remote node and only if the metadata set is the first set in the data structure;

receiving a completion acknowledgement from the remote node indicating that a particular data or metadata set is successfully stored to the remote node;

removing the particular data or metadata set from the data structure;

receiving, from the mirroring client, completion queries for querying whether the data or metadata requests are completed;

assigning a request identifier for each data and metadata request stored to the data structure;

producing a request field for responding to completion queries from the mirroring client; and updating the request field based on the request identifier of the first request stored in the data structure.

2. The system of claim 1, wherein:

OOD of data between the local and remote nodes occurs when data is not received at the remote node in the same time order as it was transmitted from the local node; and a related group comprises one or more data sets that are received by the mirroring engine after a previous metadata set, that is not in the related group, and comprises a metadata set, that is in the related group, received by the mirroring engine next after the one or more data sets.

3. The system of claim 1, wherein:

the mirroring engine is configured for storing data and metadata to the remote node using OOD of data while data integrity is provided at the remote node, without requiring use of a processor of the remote node; and data integrity at the remote node exists when, for each related group, the metadata set of the related group is stored to the remote node only after each data set in the related group is stored to the remote node.

4. The system of claim 1, wherein:

the remote node is a predetermined failover partner node of the local node for resuming functions of the local node upon failure of the local node; and the plurality of data and metadata sets from the mirroring client is stored to a local non-volatile storage device on the local node and stored to a remote non-volatile storage device on the remote node for failover protection.

5. The system of claim 1, wherein data sets of different related groups are transmitted to the remote node in parallel.

6. The system of claim 1, wherein the mirroring engine is further configured for:

receiving a completion acknowledgement from the remote node indicating that a particular data or metadata request is completed; and updating the request field only if each request in the data structure received prior to the particular data or metadata request is completed.

7. A method for storing data and metadata from a local node to a remote node, the method comprising:

providing the local node comprising a mirroring engine configured for:

receiving a plurality of data and metadata sets from a mirroring client, each received data or metadata set comprising a data or metadata request from the mirroring client to store the data or metadata set to the remote node, the received data and metadata sets comprising at least one related group, each related group comprising one or more data sets and one metadata set that describes and is associated with each of the one or more data sets in the related group;

storing received data and metadata sets to a data structure according to a time order the data and metadata sets are received;

transmitting each data set to the remote node through a switching fabric that provides multiple connection paths between the local and remote nodes that results in out-of-order delivery (OOD) of data between the local and remote nodes;

transmitting each metadata set, stored in the data structure, to the remote node through the switching fabric only after each data set in its related group is successfully stored to the remote node and only if the metadata set is the first set in the data structure;

receiving a completion acknowledgement from the remote node indicating that a particular data or metadata set is successfully stored to the remote node;

removing the particular data or metadata set from the data structure;

receiving, from the mirroring client, completion queries for querying whether the data or metadata requests are completed;

assigning a request identifier for each data and metadata request stored to the data structure;

producing a request field for responding to completion queries from the mirroring client; and updating the request field based on the request identifier of the first request stored in the data structure.

8. The method of claim 7, wherein:

OOD of data between the local and remote nodes occurs when data is not received at the remote node in the same time order as it was transmitted from the local node; and a related group comprises one or more data sets that are received by the mirroring engine after a previous metadata set, that is not in the related group, and comprises a metadata set, that is in the related group, received by the mirroring engine next after the one or more data sets.

9. The method of claim 7, wherein:

the mirroring engine is configured for storing data and metadata to the remote node using OOD of data while data integrity is provided at the remote node, without requiring use of a processor of the remote node; and data integrity at the remote node exists when, for each related group, the metadata set of the related group is stored to the remote node only after each data set in the related group is stored to the remote node.

10. The method of claim 7, wherein:

the remote node is a predetermined failover partner node of the local node for resuming functions of the local node upon failure of the local node; and the plurality of data and metadata sets from the mirroring client is stored to a local non-volatile storage device on the local node and stored to a remote non-volatile storage device on the remote node for failover protection.

11. The method of claim 7, wherein data sets of different related groups are transmitted to the remote node in parallel.

12. The method of claim 7, wherein the mirroring engine is further configured for:

receiving a completion acknowledgement from the remote node indicating that a particular data or metadata request is completed; and updating the request field only if each request in the data structure received prior to the particular data or metadata request is completed.

13. A system for storing data and metadata from a local node to a remote node, the system comprising:

the local node comprising a mirroring engine configured for:

receiving a plurality of data and metadata sets from a mirroring client, each received data or metadata set comprising a data or metadata request from the mirroring client to store the data or metadata set to the remote node, the received data and metadata sets comprising at least one related group, each related group comprising one or more data sets and one metadata set that describes and is associated with each of the one or more data sets in the related group;

storing received data and metadata sets to a data structure according to a time order the data and metadata sets are received;

transmitting each data set to the remote node through a switching fabric that provides multiple connection paths between the local and remote nodes that results in out-of-order delivery (OOD) of data between the local and remote nodes;

transmitting each metadata set, stored in the data structure, to the remote node through the switching fabric only if the metadata set is the first set in the data structure;

receiving a completion acknowledgement from the remote node indicating that a particular data or metadata set is successfully stored to the remote node;

removing the particular data or metadata set from the data structure;

receiving, from the mirroring client, completion queries for querying whether the data or metadata requests are completed;

assigning a request identifier for each data and metadata request stored to the data structure;

producing a request field for responding to completion queries from the mirroring client; and updating the request field based on the request identifier of the first request stored in the data structure.

14. The system of claim 13, wherein:

OOD of data between the local and remote nodes occurs when data is not received at the remote node in the same time order as it was transmitted from the local node; and a related group comprises one or more data sets that are received by the mirroring engine after a previous metadata set, that is not in the related group, and comprises a metadata set, that is in the related group, received by the mirroring engine next after the one or more data sets.

15. A method for storing data and metadata from a local node to a remote node, the method comprising:

providing the local node comprising a mirroring engine configured for:

receiving a plurality of data and metadata sets from a mirroring client, each received data or metadata set comprising a data or metadata request from the mirroring client to store the data or metadata set to the remote node, the received data and metadata sets comprising at least one related group, each related group comprising one or more data sets and one metadata set that describes and is associated with each of the one or more data sets in the related group;

storing received data and metadata sets to a data structure according to the time order the data and metadata sets are received;

transmitting each data set to the remote node through a switching fabric that provides multiple connection paths between the local and remote nodes that results in out-of-order delivery (OOD) of data between the local and remote nodes;

transmitting each metadata set, stored in the data structure, to the remote node through the switching fabric only if the metadata set is the first set in the data structure;

receiving a completion acknowledgement from the remote node indicating that a particular data or metadata set is successfully stored to the remote node;

removing the particular data or metadata set from the data structure;

receiving, from the mirroring client, completion queries for querying whether the data or metadata requests are completed;

assigning a request identifier for each data and metadata request stored to the data structure;

producing a request field for responding to completion queries from the mirroring client; and updating the request field based on the request identifier of the first request stored in the data structure.

16. The method of claim 15, wherein:

OOD of data between the local and remote nodes occurs when data is not received at the remote node in the same time order as it was transmitted from the local node; and a related group comprises one or more data sets that are received by the mirroring engine after a previous metadata set, that is not in the related group, and comprises a metadata set, that is in the related group, received by the mirroring engine next after the one or more data sets.

* * * * *